United States Patent
Favero et al.

(10) Patent No.: US 11,767,381 B2
(45) Date of Patent: Sep. 26, 2023

(54) 2-DIMETHYLAMINOETHYL ACRYLATE POLYMERS AND THEIR PREPARATION METHOD

(71) Applicant: SNF Group, Andrezieux Boutheon (FR)

(72) Inventors: Cédrick Favero, Andrezieux Boutheon (FR); Johann Kieffer, Andrezieux Boutheon (FR); Benoît Legras, Andrezieux Boutheon (FR); Nicolas Boisse, Taixing (CN); Jing Ling, Taixing (CN)

(73) Assignee: SNF Group, Andrezieux Boutheon (FR)

( * ) Notice: Subject to any disclaimer, the term of this patent is extended or adjusted under 35 U.S.C. 154(b) by 0 days.

(21) Appl. No.: 17/934,378

(22) Filed: Sep. 22, 2022

(65) Prior Publication Data

US 2023/0114764 A1 Apr. 13, 2023

(30) Foreign Application Priority Data

Sep. 29, 2021 (CN) .......................... 202111152476.3
Oct. 21, 2021 (FR) ........................................ 2111192

(51) Int. Cl.
*C08F 120/34* (2006.01)
*C08K 5/1545* (2006.01)

(52) U.S. Cl.
CPC .......... *C08F 120/34* (2013.01); *C08K 5/1545* (2013.01)

(58) Field of Classification Search
CPC ............................ C08F 120/34; C08K 5/1545
USPC .......................................................... 524/110
See application file for complete search history.

(56) References Cited

U.S. PATENT DOCUMENTS

| 10,343,980 | B2 | 7/2019 | Krill et al. |
| 2003/0191338 | A1 | 10/2003 | Johnston et al. |
| 2019/0085113 | A1* | 3/2019 | Inoubli ................. B33Y 70/00 |

FOREIGN PATENT DOCUMENTS

WO 2017/187067 A1 11/2017

OTHER PUBLICATIONS

Becker, H., The Role of Hydroquinone Monomethyl Ether in the Stabilization of Acrylic Acid, Chemical Engineering & Technology / Sep. 26, 2006, vol. 29, Issue 10, p. 1227-1231, https://doi.org/10.1002/ceat.200500401.
French Search Report mailed for FR 2111192 dated Jul. 12, 2022 (and English translation thereof).

* cited by examiner

*Primary Examiner* — Deve V Hall
(74) *Attorney, Agent, or Firm* — Heslin Rothenberg Farley & Mesiti P.C.

(57) ABSTRACT

The present invention relates to a water-soluble polymer obtained by polymerization of at least a 2-dimethylaminoethyl acrylate monomer and/or its salts, in presence of at least a tocopherol and/or its derivatives, or a tocotrienol and/or its derivatives, and its uses.

20 Claims, 1 Drawing Sheet

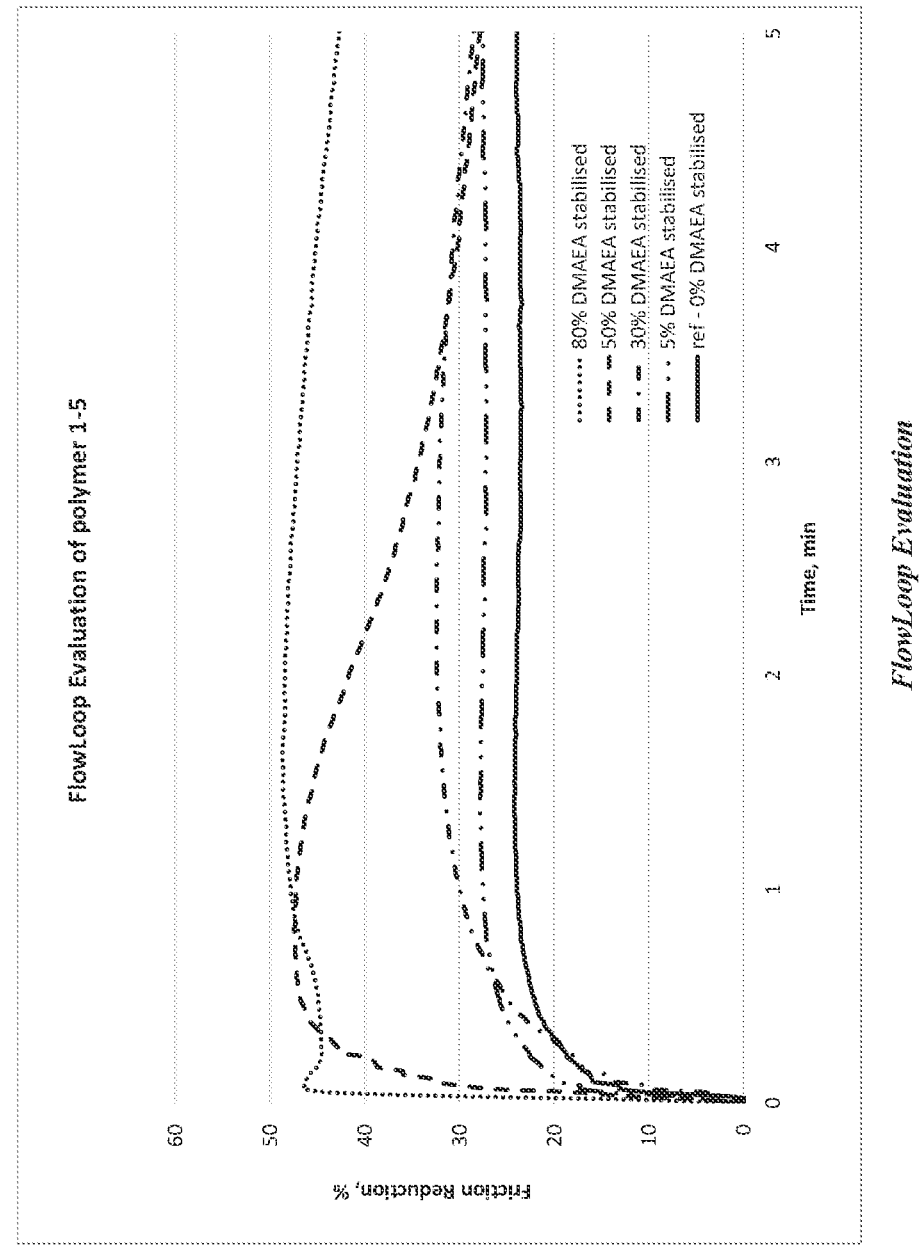

2-DIMETHYLAMINOETHYL ACRYLATE POLYMERS AND THEIR PREPARATION METHOD

CROSS REFERENCE TO RELATED APPLICATIONS

This application claims priority to Chinese Patent Application No. 202111152476.3 filed on Sep. 29, 2021 and to French Patent Application No. 2111192 filed on Oct. 21, 2021. The entire contents of both priority documents are hereby incorporated by reference herein.

TECHNICAL FIELD OF THE INVENTION

The present invention relates to a water-soluble polymer obtained from a composition comprising at least one 2-dimethylaminoethyl acrylate monomer and/or its salts combined with at least a tocopherol and/or its derivatives, or a tocotrienol and/or its derivatives, and its uses.

BACKGROUND 2-dimethylaminoethyl acrylate is a well-known monomer used to make polymers used in many industries, such as water treatment, papermaking, home and personal care or oil & gas industry such as enhanced oil recovery, hydraulic fracturing, water shut-off and others.

During long storage periods or long-distance transportations, these monomers are subject to degradation due to the Cope elimination. The Cope elimination is a syn periplanar elimination in which six electrons move in a five-membered ring according to the following scheme 1:

Scheme 1

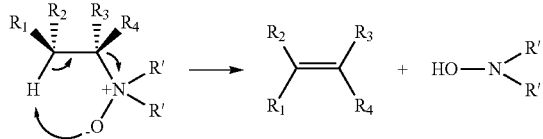

The natural dioxygen present, which is necessary to activate polymerization inhibitor such as monomethyl ether hydroquinone (MeHQ), during the storage of said monomers can react with the tertiary amine and form an amine oxide. The amine oxide is cleavable under thermally induced mechanism into vinyl acrylate and a hydroxy dimethylamine in the case of 2-dimethylaminoethyl acrylate monomer.

The Cope elimination is a usual phenomenon, resulting in the formation of a non-negligible quantity of vinyl acrylate when said monomers are stored for a long period. Vinyl acrylate can also be formed during the synthesis of said monomers.

In some industries, for example in the hydraulic fracturing industry or in the paper industry, there is a need for very high molecular weight and fully linear polymer, for example as friction reducer or as retention aid for paper. This impurity creates covalent linkage between two 2-dimethylaminoethyl acrylate monomers and when preparing polymers from monomers comprising vinyl acrylate, their performances are considerably decreased.

The document U.S. Pat. No. 10,343,980 describes the preparation of N,N-(di)alkylaminoalkyl(meth)acrylamide or N,N-(di)alkylaminoalkyl (meth)acrylate and the quaternary ammonium salt by controlling the amount of dioxygen present during the synthesis of said monomers and so the amount of vinyl acrylate present during the polymerization.

The control of the operating conditions of the above-described processes has to be very strict and additional treatment steps, like purification steps, can lead to the formation of various by-products, most of which cannot remain in the end product. These additional steps will automatically lead to known disadvantages, for example yield losses, increased operating and maintenance costs and most importantly will not prevent the formation of additional vinyl acrylate impurities once the monomers are stored caused by the presence of dioxygen during the storage, which is necessary for the activation of polymerization inhibitor such as MeHQ, as described in the publication "*The role of hydroquinone monomethyl ether in the stabilization of acrylic acid*", Holger Becker and Herbert Vogel, *Chem. Eng. Technol.* 2006, 29, No. 10, 1227-1231.

The applicant has surprisingly found that by combining 2-dimethylaminoethyl acrylate monomers and/or their salts with at least a tocopherol and/or its derivatives, or a tocotrienol and/or its derivatives, the vinyl acrylate formation is inhibited and polymers resulting from said monomers and/or their salts have better performances.

The preparation of the polymers of the invention is part of a general principle of improving products performances. The better performances of the polymers of the invention allow the reduction of the quantity of product necessary for the application and reduce water consumption, therefore implicitly participate in the reduction of greenhouse gas emissions such as $CO_2$.

SUMMARY OF THE INVENTION

The present invention concerns a water-soluble polymer obtained by polymerization of at least a 2-dimethylaminoethyl acrylate monomer and/or its salts in presence of at least a tocopherol and/or its derivatives, or a tocotrienol and/or its derivatives.

The invention also concerns the process for preparing such a water-soluble polymer, comprising a polymerization of at least one 2-dimethylaminoethyl acrylate monomer and/or its salts in presence of at least a tocopherol and/or its derivatives, or a tocotrienol and/or its derivatives.

The invention also concerns a process for inhibiting the formation of vinyl acrylate resulting from a reaction between at least a 2-dimethylaminoethyl acrylate monomer and/or its salts and oxygen, comprising mixing said 2-dimethylaminoethyl acrylate monomer and/or its salts with a tocopherol and/or its derivatives, or a tocotrienol and/or its derivatives.

The present invention also concerns a composition comprising:
- from 1 to 99.9999 w % of at least one 2-dimethylaminoethyl acrylate monomer and/or its salts;
- from 1 to 10 000 ppm of at least a tocopherol and/or its derivatives, or a tocotrienol and/or its derivatives, based on the amount of 2-dimethylaminoethyl acrylate monomer and/or its salts;
- Optionally at least an additive chosen from biocides, polymerization inhibitors, humidity absorbers, colour stabilisers.

The amount of 2-dimethylaminoethyl acrylate monomer and/or its salts, and optionally the additive, is expressed with respect to the total weight of the composition. The amount of tocopherol and/or its derivatives, or tocotrienol and/or its derivatives, is expressed with respect to the amount of 2-dimethylaminoethyl acrylate monomer and/or its salts.

The skilled person knows how to adjust the amounts of the constituents of the composition, in particular the amounts of 2-dimethylaminoethyl acrylate monomer and/or its salts, tocopherol and/or its derivatives, or tocotrienol and/or its derivatives, and optionally the additive, to reach 100 w %.

The present invention also concerns the use of said water-soluble polymer in water treatment, sludge dewatering, papermaking process, agriculture, cosmetic and detergency composition, textile process, oil and gas process.

Finally, the present invention also concerns the use of said water-soluble polymer as a dispersant, coagulant, flocculant, thickener, grinding agent, drag reducer, superabsorbent, retention aid.

DESCRIPTION OF THE INVENTION

As used herein, the term «polymer» refers to a homopolymer or a copolymer comprising at least two different monomers.

As used herein, the expression "A and/or B" means "A or B, or A and B".

As used herein, the term "water-soluble polymer" refers to a polymer which gives an aqueous solution (concentration of 10 g·L-1 at 25° C.) without insoluble particles after it has been appropriately mixed with water.

The present invention concerns a water-soluble polymer obtained from a composition comprising at least one 2-dimethylaminoethyl acrylate monomer and/or its salts combined with at least a tocopherol and/or its derivatives, or a tocotrienol and/or its derivatives.

Tocopherol and its derivatives, and tocotrienol and its derivatives, exist in four different forms α (alpha), β (beta), γ (gamma), and δ (delta) depending on their substituents and their positions.

Tocopherols Derivatives:

In this case, the 2-dimethylaminoethyl acrylate monomer and/or its salts is preferably combined with an α-tocopherol.

The quantity of tocopherol(s) and/or its derivatives, and/or tocotrienol(s) and/or its derivatives is preferably comprised between 1 ppm and 10 000 ppm, based on the amount of 2-dimethylaminoethyl acrylate monomer and/or its salts, preferably between 1 ppm and 1 000 ppm, more preferably between 5 ppm and 500 ppm, and even more preferably between 5 ppm and 50 ppm.

The tocopherol and/or its derivatives, or the tocotrienol and/or its derivatives, can be combined with the 2-dimethylaminoethyl acrylate monomer and/or its salts at any time.

More precisely, the tocopherol and/or its derivatives, or the tocotrienol and/or its derivatives can be combined before, during, at the end or after the synthesis of the 2-dimethylaminoethyl acrylate monomer and/or its salts. Preferably, they are added after the synthesis of the 2-dimethylaminoethyl acrylate monomer.

The tocopherol and/or its derivatives, or the tocotrienol and/or its derivatives can be combined before, during, at the end or after a purification step of the 2-dimethylaminoethyl acrylate monomer and/or its salts. Preferably, they are added after the purification step.

The Purification step(s) comprise, for example and without limitation, distillation, fractional distillation, crystallisation. Preferably the purification step is a fractional distillation.

The tocopherol and/or its derivatives, or the tocotrienol and/or its derivatives can also be combined before or during the storage of the 2-dimethylaminoethyl acrylate monomers and/or their salts, or just before their polymerization or just before their quaternization or salification. Preferably they

TABLE 1

| Tocopherols derivatives | $R^1$ | $R^2$ | $R^3$ | Name |
|---|---|---|---|---|
| (structure with R1, HO, R2, R3, O) | $CH_3$ | $CH_3$ | $CH_3$ | α-Tocopherol |
| | $CH_3$ | H | $CH_3$ | β-Tocopherol |
| | H | $CH_3$ | $CH_3$ | γ-Tocopherol |
| | H | H | $CH_3$ | δ-Tocopherol |

TABLE 2

| Tocotrienols derivatives | $R^1$ | $R^2$ | $R^3$ | Name |
|---|---|---|---|---|
| (structure with R1, HO, R2, R3, O) | $CH_3$ | $CH_3$ | $CH_3$ | α-Tocotrienol |
| | $CH_3$ | H | $CH_3$ | β-Tocotrienol |
| | H | $CH_3$ | $CH_3$ | γ-Tocotrienol |
| | H | H | $CH_3$ | δ-Tocotrienol |

Tocotrienols derivatives:

In a preferred embodiment of the invention, the 2-dimethylaminoethyl acrylate monomer and/or its salts is combined with a tocopherol and/or a tocotrienol.

In a more preferred embodiment of the invention, the 2-dimethylaminoethyl acrylate monomer and/or its salts is combined with a tocopherol.

are combined before storage of the 2-dimethylaminoethyl acrylate monomers and/or its salts.

In order to increase the efficiency of the inhibition of the vinyl acrylate formation, the tocopherol and/or its derivatives, or the tocotrienol and/or its derivatives, and the 2-dimethylaminoethyl acrylate monomer and/or its salts, are preferably mixed homogeneously.

The mixing can be carried out, for example and without limitation, by agitation, in static mixer, in a recirculation loop, by gas bubbling. Preferably the mixing is carried out by agitation.

The duration of the mixing ensures the homogeneity of the composition. Generally, the mixing lasts at least 1 min, preferably at least 10 min, more preferably at least 30 min, and even more preferably at least 60 min.

According to the state of the art, the 2-dimethylaminoethyl acrylate monomers and/or their salts are generally stored for less than 3 months in order to limit the amount of vinyl acrylate formed to around 20 ppm. According to the invention, said monomers can be stored for 6 months, and the amount of vinyl acrylate is less than 10 ppm based on the amount of 2-dimethylamonoethyl acrylate monomers, and after 12 months the amount of vinyl acrylate formed is less than 20 ppm.

The vinyl acrylate concentration in the 2-dimethylaminoethyl acrylate monomers can be determined using GC analysis; instrument Agilent 7820A with a MS detector equipped with DB-WAX column 30 m, helium for gas carrier at 1 mL/min. Injector temperature and transfer line are maintained at 250° C. Injection is done with 1 µL at 1:100 split ratio. The oven temperature is at 80° C. for 5 min, then increased at 5° C./min to 122° C. for 2 min then temperature is increased to 240° C. at 35° C./min for 11 min.

The 2-dimethylaminoethyl acrylate monomer can be in its neutral, quaternized, or salified form. The 2-dimethylaminoethyl acrylate can be partially or totally quaternized or salified. Preferably the 2-dimethylaminoethyl acrylate monomer, when quaternized, is quaternized with methyl chloride.

Preferably the water-soluble polymer of the invention comprised at least 1 mol % of the 2-dimethylaminoethyl acrylate monomer and/or its salts (from the composition), based on the total number of moles of monomers in the polymer, preferably at least 2 mol %, more preferably at least 5 mol %, more preferably at least 10 mol %, more preferably at least 15 mol %, more preferably at least 20 mol %, more preferably at least 25 mol %, even more preferably at least 30 mol %.

Another object of the invention is a composition comprising:
 from 1 to 99.9999% of at least one 2-dimethylaminoethyl acrylate monomer and/or its salts;
 from 1 to 10 000 ppm of at least a tocopherol and/or its derivatives, or a tocotrienol and/or its derivatives, based on the amount of 2-dimethylaminoethyl acrylate and/or its salts;
 Optionally at least an additive chosen from biocides, polymerization inhibitors, humidity absorbers, colour stabilisers.

In a preferred embodiment of the invention, the composition comprises between 5 and 95% of the 2-dimethylaminoethyl acrylate monomer and/or its salts.

In a preferred embodiment of the invention, the composition comprises between 2 and 10 000 ppm of at least a tocopherol and/or its derivatives, or a tocotrienol and/or its derivatives based on the amount of 2-dimethylaminoethyl acrylate and/or its salts, more preferably between 5 and 1 000 ppm.

Above 10 000 ppm of tocopherol and/or its derivatives, or tocotrienol and/or its derivatives based on the amount of 2-dimethylaminoethyl acrylate and/or its salts, the economic interest of the composition falls of dramatically. Under 1 ppm of tocopherol and/or its derivatives, or of tocotrienol and/or its derivatives, the effect of preventing the formation of vinyl acrylate is a lot weaker and thus not significant.

The composition of the invention can comprise other additives like for example and without limitation, biocides, polymerization inhibitors, humidity absorbers, colour stabilisers, and others.

In a preferred embodiment of the invention, the composition comprises at least one colour stabiliser chosen from: niacinamide, retinol, 3-tertiobutyl-4-hydroxyanisole (3-BHA), 2-tertiobutyl-4-hydroxyanisole and 2,6,-di-tert-butyl-4-methylphenol. More preferably the colour stabiliser is 2,6-di-tert-butyl-4-methylphenol.

When using a colour stabiliser, the ratio in weight between the tocopherol or its derivatives, or the tocotrienol or its derivatives and the colour stabiliser is comprised between 1 and 100, preferably between 2 and 10.

The Water-Soluble Polymer

The water-soluble polymer of the invention can be obtained by polymerization of the composition described above and/or non-ionic monomers, and/or anionic monomers, and/or cationic monomers, and/or zwitterionic monomers. Since the 2-dimethylaminoethyl acrylate monomer is cationic, the water-soluble polymer of the invention is cationic or amphoteric.

Additional cationic monomer(s) that may be used in the invention are preferably chosen from water-soluble vinyl monomers, more particularly from the acrylamide, acrylic, allylic or maleic type having a quaternary ammonium group. In particular and without limitation, quaternised or salified 2-dimethylaminoethyl acrylate (DMAEA), quaternised or salified 2-dimethylaminoethyl methacrylate (DMAEMA), quaternised or salified allylamine, quaternised or salified allydimethylamine, quaternised or salified diallylmethylamine, dimethyldiallylammonium chloride (DADMAC), quaternised or salified dimethylaminopropyl acrylamide, acrylamido propyltrimethyl ammonium chloride (APTAC), quaternised or salified dimethylaminopropyl methacrylamide and methacrylamido propyltrimethyl ammonium chloride (MAPTAC). Preferably, the additional cationic monomer is dimethyldiallylammonium chloride (DADMAC).

The water-soluble polymer preferably comprises between 0 and 99 mol % of additional cationic monomer(s) based on the total number of moles of monomers of said polymer, preferably 99 mol % or less, more preferably 98 mol % or less, more preferably 95 mol % or less, more preferably 90 mol % or less, more preferably 85 mol % or less, more preferably 80 mol % or less, more preferably 75 mol % or less, more preferably 70 mol % or less, and even more preferably 50 mol % or less.

Non-ionic monomer(s) that may be used in the invention are preferably chosen from water-soluble vinyl monomers. Preferred monomers belonging to this family are, for example, acrylamide, methacrylamide, N-isopropylacrylamide, N-tert-butylacrylamide, N,N-dimethylacrylamide, N-methylolacrylamide, N-vinylformamide, N-vinylimidazole, N-vinyl acetamide, N-vinylpyridine, N-vinylpyrrolidone, acryloyl morpholine (ACMO), diacetone acrylamide, and mixtures thereof. Preferably, the non-ionic monomer is acrylamide.

The water-soluble polymer preferably comprises between 0 and 99 mol % of non-ionic monomer(s) based on the total number of moles of monomers of said polymer, preferably 95 mol % or less, preferably 90 mol % or less, more preferably 80 mol % or less, and even more preferably 70 mol % or less.

Anionic monomer(s) that may be used in the invention are preferably chosen from monomers having a carboxylic function and salts thereof, monomers having a sulfonic acid function and salts thereof, monomers having a phosphonic acid function and salts thereof. Anionic monomers include for example acrylic acid, acrylamide tertiary butyl sulfonic acid, methacrylic acid, maleic acid, itaconic acid; and hemi esters thereof. The most preferred anionic monomers are acrylic acid, acrylamide tertiary butyl sulfonic acid (ATBS), 3-Allyloxy-2-hydroxy-1-propanesulfonic acid, and salts thereof. Preferably, the anionic monomer is acrylic acid.

The anionic monomers may be unsalified, or partially or totally salified.

The salified form corresponds preferably to an alkali metal (Li, Na, K . . . ), an alkaline earth metal (Ca, Mg . . . ) or ammonium salts, in particular quaternary ammonium. The preferred salts are sodium salts.

The unsalified form corresponds to the acid form of the anionic monomer, e.g. CH2=CH—C(=O)OH in the case of acrylic acid. The salification may be carried out prior to and/or during and/or after the polymerization. The salification may be partial or total.

The anionic part of the water-soluble polymer can be obtained by post hydrolysis.

Post-hydrolysis reaction is a chemical reaction on a polymer after its formation by polymerization of monomers. This step consists in reacting hydrolysable functional groups of monomers, preferably non-ionic monomers, more preferably monomers containing a hydrolysable function (preferably amide or ester), with a hydrolysis agent. This hydrolysis agent can be an enzyme, an ion exchange resin, or an alkali metal. Preferably, the hydrolysis agent is a Brönsted base, e.g. NaOH or KOH. During this post-hydrolysis step of the polymer, the number of carboxylic acid functions (COOH) and/or carboxylate functions (COO—) increases. Indeed, the reaction between the hydrolysis agent (for instance a Brönsted base) and the hydrolysable function (for instance an amide or an ester function) present in the polymer produces carboxylate groups. The hydrolysis may be carried out prior to and/or during and/or after the polymerization. The hydrolysis may be partial or total.

The water-soluble polymer preferably comprises between 0 and 100 mol % of salified form of the anionic monomer(s) based on the total number of moles of anionic monomers in the polymer.

The water-soluble polymer preferably comprises between 0 and 99 mol % of anionic monomer based on the total number of moles of monomers of said polymer, preferably 40 mol % or less, preferably 30 mol % or less, more preferably 20 mol % or less, and even more preferably 10 mol % or less.

In a particular embodiment of the invention, the anionic monomer is 2-acrylamido-2-methylpropane sulfonic acid in its hydrated form. The hydrated form of 2-acrylamido-2-methylpropane sulfonic acid is a particular form of 2-acrylamido-2-methylpropane sulfonic acid obtainable by controlled crystallization of the 2-acrylamido-2-methylpropane sulfonic acid monomer. The document U.S. Pat. No. 10,759,746 describes how to obtain the hydrated form of 2-acrylamido-2-methylpropane sulfonic acid.

Water-soluble zwitterionic monomer(s) and hydrophobic monomer(s) may be used as additional monomers in the polymer of the invention.

The skilled person knows that a polymer composition cannot exceed 100 mol % of monomers when preparing the water-soluble polymer according to the invention. He will thus adjust the quantities of monomer(s) described previously in order not to exceed 100 mol %.

According to the invention, the water-soluble polymer may have a linear structure, branched, star, comb, block, microblock structure or a controlled polydispersity in molecular weight. These properties can be obtained by selection of one or more of the following: the initiator, the transfer agent, the polymerization technique.

The general knowledge of the skilled person allows him to prepare a water-soluble polymer having one of these types of structure. The water-soluble polymer of the invention, with a specific morphology as described above, remains water-soluble.

The water-soluble polymer may be crosslinked. When using a crosslinking agent, the quantity used is such that the water-soluble polymer remains water-soluble. The skilled person knows how to adjust the quantity of crosslinking agent and, when applicable, the quantity of the chain transfer agent, such that the water-soluble polymer remains water-soluble.

In a preferred embodiment of the invention, the water-soluble polymer of the invention is not crosslinked.

The water-soluble polymer according to the invention has preferably an average molecular weight by weight comprised between 50 000 g/mol and 30 000 000 g/mol, preferably between 100 000 g/mol and 20 000 000 g/mol, more preferably between 500 000 g/mol and 15 000 000 g/mol. The average molecular weight by weight is preferably higher than or equal to 1 million g/mol, more preferably higher than or equal to 2 million g/mol, even more preferably higher than or equal to 10 million g/mol.

According to the present invention, the weight average molecular weight is determined by the intrinsic viscosity. The intrinsic viscosity can be measured by methods known to the skilled person. The intrinsic viscosity can be calculated from the values of reduced viscosity for different concentrations by a graphical method consisting of plotting the reduced viscosity values (on the ordinate axis) against the concentrations (on the abscissa) and extrapolating the curve to concentration zero. The intrinsic viscosity value is read off the ordinate axis or by using the least square method. Then the weight average molecular weight can be determined by the Mark-Houwink equation:

$$[\eta]=KM^\alpha$$

wherein:

$[\eta]$ is the intrinsic viscosity of the polymer determined by solution viscosity measuring method, K is an empiric constant, M is the molecular weight of the polymer, $\alpha$ is the Mark-Houwink coefficient.

$\alpha$ and K depend on the particular polymer-solvent system. There are tables that give the values of $\alpha$ and K according to the polymer-solvent system.

The formation of the water-soluble polymer does not require a specific polymerization process. The water-soluble polymer can be obtained by all polymerization techniques known to the skilled person resulting in a polymer being, preferably, in powder form, such as the following techniques: gel polymerization followed by drying and grinding steps; precipitation polymerization; solution polymerization, followed by spray drying step; inverse emulsion polymerization, followed by spray drying step; reverse suspension polymerization, advantageously for obtaining microbeads; micellar polymerization followed or not by a precipitation step; post-hydrolysis or co-hydrolysis polymerization; so-called "template" polymerization, radical, or controlled radical, and more particularly of the RAFT type (Reversible Addition Fragmentation Chain Transfer).

The water-soluble monomer polymerization is a free radical polymerization. Free radical polymerization means, within the meaning of the invention, a free radical polymerization using at least one UV, azo, redox or thermal initiator or a controlled radical polymerization technique (CRP) or a matrix polymerization technique. The water-soluble polymer may be used under any form known by the skill person such as an aqueous solution, a powder, a water-in-oil emulsion, or a polymer dispersion in brine. Preferably, as mentioned previously, the water-soluble polymer is in powder form.

When polymerizing the 2-dimethylaminoethyl acrylate monomers and/or its salts combined with at least the tocopherol or its derivatives, or the tocotrienol or its derivatives, the content of vinyl acrylate is generally less than 20 ppm based on the total amount of 2-dimethylaminoethyl acrylate monomers and/or its salts used during the polymerization, preferably less than 10 ppm, more preferably less 5 ppm.

The non-ionic monomer used in the polymer of the invention is preferably acrylamide. Acrylamide is preferably produced from acrylonitrile by a biologic process comprising the use of nitrile hydratase. Improved nitrile hydratases have been developed to increase the productivity of the biologic process. Generally, the improvement consists of modifying the protein sequence of wild type nitrile hydratase. For example, some improvements are made by modifying the alpha and/or beta sub-unit of the protein sequence of wild type nitrile hydratase.

The following paragraphs describe improved nitrile hydratase.

An improved nitrile hydratase is derived from a wild-type nitrile hydratase but is not limited to any specific wild type. Here, a "wild-type nitrile hydratase" indicates: a nitrile hydratase isolated from living organisms found in nature (microorganisms such as soil bacteria, for example); the amino-acid sequence forming the enzyme and the base sequence of the gene encoding the enzyme are not artificially deleted, inserted, or substituted by other amino acids or bases; and the nitrile hydratase retains the naturally existing original properties.

A "wild-type nitrile hydratase" has a higher-order structure formed with α and β sub-unit domains, and contains a non-heme iron atom or a non-corrin cobalt atom as a prosthetic molecule. Such a nitrile hydratase is identified and referred to as an iron-containing nitrile hydratase or a cobalt-containing nitrile hydratase.

For cobalt-containing nitrile hydratase, examples are those derived from *Rhodococcus rhodochrous* J1 strain (hereinafter may be referred to as "J1 strain") or derived from *Pseudonocardia thermophila* JCM3095. A cobalt-containing nitrile hydratase derived from the J1 strain is bonded with a cobalt atom by a site identified as a cysteine cluster that forms the active site of the α sub-unit.

Preferred wild type nitrile hydratase are *Rhodococcus rhodochrous* J1-H, *Rhodococcus rhodochrous* M8, *Rhodococcus ruber* TH, *Rhodococcus pyridinovorans* MW3, and *P. thermophila* JCM3095.

Improved (mutant) nitrile hydratase are generally formed by substituting amino acids of a wild-type nitrile hydratase in alpha and/or in beta sub-unit. Amino-acid sequences of wild-type nitrile hydratases to be substituted are made in public in NCBI databases such as GenBank (http://www.ncbi.nlm.nih.gov/) and the like.

The improved nitrile hydratase is characterized by the modification of the amino-acid sequence of a wild type nitrile hydratase, said modification comprising at least one amino-acid modification, preferably at least two amino-acid modifications, more preferably at least three amino-acid modifications on the beta sub-unit chosen from the following list: 14S, 14Q, 14D, 17G, 17E, 17A, 17V, 17W, 43H, 43Q, 43N, 46H, 46T, 48D, 48W, 48D, 57V, 57M, 57G, 69F, 69T, 77P, 77E, 95Y, 95M, 95V, 97A, 97W, 107M, 107K, 107H, 114Y, 114F, 114W, 114M, 133R, 133G, 133I, 167S, 167T, 167Y, 179C, 179M, 179T, 202P, 202W, 218T, 218H, 218V, 219A, 219N, 219R; and at least one amino-acid modification on the alpha sub-unit chosen from the following list: 49H, 49W, 68G, 68T, 112V, 112P, 174K, 174L, 174C, 187A, 187G, 187V.

The numbers correspond to an amino-acid residue at position «XXX» (a number comprising 1, 2 or 3 digits) counted downstream from the N-terminal amino-acid residue in the amino-acid sequence of a 3 sub-unit or the alpha sub-unit.

Possible combinations are listed below. AA means amino-acid, and the common-used abbreviations for amino-acids are used such as A for Alanine. If a position is not mentioned the amino-acid is the amino-acid of the wild type nitrile hydratase. For example position β15 is not mentioned in the following combinations, it means that the amino-acid on position β15 is the amino-acid of the wild type amino-acid in position β15. The following combinations comprise the modification α174L but the description also comprises the same combinations in which the modification α174L is replaced by the modifications α174K or α174C.

List of Combinations

α174L, β17G, β46T, β48N, β57M, β95V, β114Y, β167S, β218H, β219A

α174L, β17G, β48W, β57M, β95V, β114Y, β167S, β218H, β219A

α174L, β17G, β48N, β57M, β95V, β114Y, β167S, β218H, β219A

α174L, β17G, β48N, β57M, β95V, β114F, β167S, β218H, β219A

α174L, β17G, β48N, β57M, β95V, β114Y, β167T, β218H, β219A

α174L, β17G, β48N, β57M, β95V, β114Y, β167S, β218H, β219A

α174L, β17G, β48N, β57M, β95V, β114Y, β167T, β218H, β219A

α174L, β57M, β95V, β114Y, β167S, β218H, β219A

α174L, β57M, β95V, β114F, β167S, β218H, β219A

α174L, β46T, β57M, β95V, β114Y, β167S, β218H, β219A

α174L, β46T, β48N, β57M, β95V, β114Y, β167S, β218H, β219A

α174L, β46T, β48N, β57M, β95V, β114Y, β167S, β218H, β219R

α174L, β46T, β48N, β57M, β95V, β114W, β167S, β218H, β219R

α174L, β46T, β48N, β57M, β95V, β114Y, β167S, β218H, β219A

α174L, β17G, β46T, β48N, β57K, β95V, β114Y, β167S, β218H, β219A

α174L, β17G, β46T, β48N, β57K, β95V, β114Y, β167S, β218H, β219A

α174L, β17G, β46T, β48N, β57K, β95V, β114Y, β167S, β218H, β219R

α174L, β17G, β46T, β48N, β57K, β95V, β114Y, β167S, β218H, β219R

α174L, β17X, β48N, β57M, β95V, β114F, β167S, β218H, β219A in the whole description, X is A or V,

α174L, β17X, β48N, β57M, β95V, β114F, β167S, β218H, β219A

α174L, β17X, β48N, β57M, β95V, β114F, β167S, β218H, β219R

α174L, β17X, β48N, β57M, β95V, β114F, β167S, β218H, β219R

α174L, β17X, β46T, β48N, β57M, β95V, β114F, β167S, β218H, β219R

α174L, β17X, β46T, β48N, β57M, β95V, β114F, β167S, β218H, β219A

α174L, β17X, β46T, β48N, β57M, β95V, β114F, β167S, β218H, β219A

α174L, β17X, β46T, β48N, β57K, β95V, β114W, β167S, β218H, β219A

α174L, β17X, β46T, β48N, β57K, β95V, β114F, β167S, β218A, β219A

α174L, β17X, β46T, β48N, β57K, β95V, β114F, β167S, β218Q, β219A

α174L, β17X, β46T, β48N, β57K, β95V, β114F, β167S, β218H, β219R

α174L, β17X, β46T, β48N, β57K, β95V, β107K, β114F, β167S, β218H, β219R

α174L, β17X, β48N, β57K, β95V, β107K, β114W, β167S, β218H, β219A

α174L, β17X, β48N, β57M, β95V, β107K, β114W, β167S, β218H, β219A

α174L, β17X, β46T, β48N, β57M, β95V, β114W, β167S, β218H, β219A

α174L, β17X, β46T, β48N, β57K, β95V, β114W, β167S, β218H, β219A

α174L, β17X, β46T, β48N, β57M, β95V, β114W, β167S, β218H, β219R

α174L, β17X, β46T, β48N, β57K, β95V, β114W, β167R, β218H, β219R

α174L, β17X, β48N, β57K, β95V, β114W, β167S, β218H, β219R

α174L, β17G, β46T, β48N, β57M, β95V, β107K, β114Y, β167S, β218H, β219A

α174L, β17G, β57M, β95V, β107L, β114Y, β167S, β218H, β219A

α174L, β17G, β48N, β57M, β95V, β107K, β114Y, β167S, β218H, β219A

α174L, β17G, β48N, β57M, β95V, β107K, β114F, β167S, β218H, β219A

α174L, β17G, β48N, β57M, β95V, β107K, β114Y, β167T, β218H, β219A

α174L, β17G, β48N, β57M, β95V, β107L, β114Y, β167S, β218H, β219A

α174L, β17G, β48N, β57M, β95V, β107L, β114Y, β167T, β218H, β219A

α174L, β57M, β95V, β107K, β114Y, β167S, β218H, β219A

α174L, β57M, β95V, β107K, β114F, β167S, β218H, β219A

α174L, β46T, β57M, β95V, β107K, β114Y, β167S, β218H, β219A

α174L, β46T, β48N, β57M, β95V, β107K, β114Y, β167S, β218H, β219A

α174L, β46T, β48N, β57M, β95V, β107K, β114Y, β167S, β218H, β219R

α174L, β46T, β48N, β57M, β95V, β107K, β114W, β167S, β218H, β219R

α174L, β46T, β48N, β57M, β95V, β107K, β114Y, β167S, β218H, β219A

α174L, β17G, β46T, β48N, β57K, β95V, β107K, β114Y, β167S, β218H, β219A

α174L, β17G, β46T, β48N, β57K, β95V, β107K, β114Y, β167S, β218H, β219A

α174L, β17G, β46T, β48N, β57K, β95V, β107K, β114Y, β167S, β218H, β219R

α174L, β17G, β46T, β48N, β57K, β95V, β107K, β114Y, β167S, β218H, β219R

α174L, β17X, β48N, β57M, β95V, β107K, β114F, β167S, β218H, β219A

α174L, β17X, β48N, β57M, β95V, β107K, β114F, β167S, β218H, β219A

α174L, β17X, β48N, β57M, β95V, β107K, β114F, β167S, β218H, β219R

α174L, β17X, β48N, β57M, β95V, β107K, β114F, β167S, β218H, β219A

α174L, β17X, β46T, β48N, β57M, β95V, β107K, β114F, β167S, β218H, β219R

α174L, β17X, β46T, β48N, β57M, β95V, β107K, β114F, β167S, β218H, β219A

α174L, β17X, β46T, β48N, β57M, β95V, β107H, β114F, β167S, β218H, β219A

α174L, β17X, β46T, β48N, β57K, β95V, β107K, β114W, β167S, β218H, β219A

α174L, β17X, β46T, β48N, β57K, β95V, β107K, β114F, β167S, β218A, β219A

α174L, β17X, β46T, β48N, β57K, β95V, β107K, β114F, β218Q, β219A

α174L, β17X, β46T, β48N, β57K, β95V, β107K, β114F, β167S, β218H, β219R

α174L, β17X, β48N, β57K, β95V, β107K, β114W, β167S, β218H, β219A

α174L, β17X, β48N, β57M, β95V, β107K, β114W, β167S, β218H, β219A

α174L, β17X, β46T, β48N, β57M, β95V, β107K, β114W, β167S, β218H, β219A

α174L, β17X, β46T, β48N, β57K, β95V, β107K, β114W, β167S, β218H, β219A

α174L, β17X, β46T, β48N, β57M, β95V, β107K, β114W, β167S, β218H, β219R

α174L, β17X, β46T, β48N, β57K, β95V, β107K, β114W, β167R, β218H, β219R

α174L, β17X, β48N, β57K, β95V, β107K, β114W, β167S, β218H, β219R

α174L, β14S, β17G, β46T, β48N, β57M, β95V, β107K, β114Y, β167S, β218H, β219A

α174L, β14S, β17G, β57M, β95V, β107L, β114Y, β167S, β218H, β219A

α174L, β14S, β17G, β48N, β57M, β95V, β107K, β114Y, β167S, β218H, β219A

α174L, β14S, β17G, β48N, β57M, β95V, β107K, β114F, β167S, β218H, β219A

α174L, β14S, β17G, β48N, β57M, β95V, β107K, β114Y, β167T, β218H, β219A

α174L, β14S, β17G, β48N, β57M, β95V, β107L, β114Y, β167S, β218H, β219A

α174L, β14S, β17G, β48N, β57M, β95V, β107L, β114Y, β167T, β218H, β219A

α174L, β14S, β57M, β95V, β107K, β114Y, β167S, β218H, β219A

α174L, β14S, β57M, β95V, β107K, β114F, β167S, β218H, β219A

α174L, β14S, β46T, β57M, β95V, β107K, β114Y, β167S, β218H, β219A

α174L, β14S, β46T, β48N, β57M, β95V, β107K, β114Y, β167S, β218H, β219A

α174L, β14S, β46T, β48N, β57M, β95V, β107K, β114Y, β167S, β218H, β219R

α174L, β14S, β46T, β48N, β57M, β95V, β107K, β114W, β167S, β218H, β219R

α174L, β14S, β46T, β48N, β57M, β95V, β107K, β114Y, β167S, β218H, β219A

α174L, β14S, β17G, β46T, β48N, β57K, β95V, β107K, β114Y, β167S, β218H, β219A

α174L, β14S, β17G, β46T, β48N, β57K, β95V, β107K, β114Y, β167S, β218H, β219A

α174L, β14S, β17G, β46T, β48N, β57K, β95V, β107K, β114Y, β167S, β218H, β219R

α174L, β14S, β17G, β46T, β48N, β57K, β95V, β107K, β114Y, β167S, β218H, β219R

α174L, β14S, β17X, β48N, β57M, β95V, β107K, β114F, β167S, β218H, β219A

α174L, β14S, β17X, β48N, β57M, β95V, β107K, β114F, β167S, β218H, β219A

α174L, β14S, β17X, β48N, β57M, β95V, β107K, β114F, β167S, β218H, β219R

α174L, β14S, β17X, β48N, β57M, β95V, β107K, β114F, β167S, β218H, β219R

α174L, β14S, β17X, β46T, β48N, β57M, β95V, β107K, β114F, β167S, β218H, β219R

α174L, β14S, β17X, β46T, β48N, β57M, β95V, β107K, β114F, β167S, β218H, β219A

α174L, β14S, β17X, β46T, β48N, β57M, β95V, β107H, β114F, β167S, β218H, β219A

α174L, β14S, β17X, β46T, β48N, β57K, β95V, β107K, β114W, β167S, β218H, β219A

α174L, β14S, β17X, β46T, β48N, β57K, β95V, β107K, β114F, β167S, β218A, β219A

α174L, β17X, β43Q, β46T, β48N, β57M, β95V, β107K, β114F, β167S, β218Q, β219A

α174L, β17X, β43Q, β46T, β48N, β57M, β95V, β107K, β114F, β167S, β218H, β219R

α174L, β17X, β43Q, β46T, β48N, β57M, β95V, β107K, β114F, β167S, β218H, β219R

α174L, β17X, β43Q, β48N, β57K, β95V, β107K, β114W, β167S, β218H, β219A

α174L, β17X, β43Q, β46T, β48N, β57M, β95V, β107K, β114W, β167S, β218H, β219A

α174L, β17X, β43Q, β46T, β48N, β57M, β95V, β107K, β114W, β167S, β218H, β219A

α174L, β17X, β43Q, β46T, β48N, β57M, β95V, β107K, β114W, β167S, β218H, β219A

α174L, β17X, β43Q, β46T, β48N, β57M, β95V, β107K, β114W, β167S, β218H, β219R

α174L, β17X, β43Q, β46T, β48N, β57M, β95V, β107K, β114W, β167R, β218H, β219R

α174L, β17X, β43Q, β48N, β57K, β95V, β107K, β114W, β167S, β218H, β219R

α174L, β14S, β17X, β46T, β48N, β57M, β95V, β107H, β114F, β167S, β218H, β219A

α174L, β14S, β17X, β46T, β48N, β57M, β95V, β107K, β114W, β167S, β218H, β219A

α174L, β14S, β17X, β46T, β48N, β57M, β95V, β107K, β114F, β167S, β218A, β219A

α174L, β17X, β43Q, β46T, β48N, β57K, β77P, β95V, β107K, β114F, β167S, β218Q, β219A

α174L, β17X, β43Q, β46T, β48N, β57K, β77P, β95V, β107K, β114F, β167S, β218H, β219R

α174L, β17X, β43Q, β46T, β48N, β57K, β77P, β95V, β107K, β114F, β167S, β218H, β219R

α174L, β17X, β43Q, β48N, β57K, β77P, β95V, β107K, β114W, β167S, β218H, β219A

α174L, β17X, β43Q, β48N, β57M, β77P, β95V, β107K, β114W, β167S, β218H, β219A

α174L, β17X, β43Q, β46T, β48N, β57M, β77P, β95V, β107K, β114W, β167S, β218H, β219A

α174L, β14S, β46T, β48N, β57M, β97A, β107K, β114W, β167S, β218H, β219R

α174L, β14S, β46T, β48N, β57M, β97A, β107K, β114Y, β167S, β218H, β219A

α174L, β14S, β17G, β46T, β48N, β57K, β97A, β107K, β114Y, β167S, β218H, β219A

α174L, β14S, β46T, β48N, β57M, β97A, β107K, β114Y, β167S, β218H, β219A

α174L, β14S, β17G, β46T, β48N, β57K, β97A, β107K, β114Y, β167S, β218H, β219R

α174L, β14S, β17G, β46T, β48N, β57K, β97A, β107K, β114Y, β167S, β218H, β219R

α174L, β14S, β17X, β48N, β57M, β97A, β107K, β114F, β167S, β218H, β219A

α174L, β14S, β17X, β48N, β57M, β97A, β107K, β114F, β167S, β218H, β219A

α174L, β14S, β17X, β48N, β57M, β97A, β107K, β114F, β167S, β218H, β219R

α49H, β17G, β48N, β57M, β95V, β114Y, β167T, β218H, β219A

α49H, β17G, β48N, β57M, β95V, β114Y, β167S, β218H, β219A

α49H, β17G, β48N, β57M, β95V, β114Y, β167T, β218H, β219A

α49H, β57M, β95V, β114Y, β167S, β218H, β219A

α49H, β57M, β95V, β114F, β167S, β218H, β219A

α49H, β46T, β57M, β95V, β114Y, β167S, β218H, β219A

α49H, β46T, β48N, β57M, β95V, β114Y, β167S, β218H, β219A

α49H, β46T, β48N, β57M, β95V, β114Y, β167S, β218H, β219R

α49H, β46T, β48N, β57M, β95V, β114W, β167S, β218H, β219R

α49H, β17X, β46T, β48N, β57M, β95V, β114F, β167S, β218H, β219R

α49H, β17X, β46T, β48N, β57M, β95V, β114F, β167S, β218H, β219A

α68T, β17X, β46T, β48N, β57M, β95V, β114F, β167S, β218H, β219A

α68T, β17X, β46T, β48N, β57K, β95V, β114W, β167S, β218H, β219A

α68T, β17X, β46T, β48N, β57K, β95V, β114F, β167S, β218A, β219A

α68T, β17X, β46T, β48N, β57K, β95V, β114F, β167S, β218Q, β219A

α68T, β17X, β46T, β48N, β57K, β95V, β114F, β167S, β218H, β219A

α68T, β17X, β46T, β48N, β57K, β95V, β107K, β114F, β167S, β218H, β219R

α68T, β46T, β48N, β57M, β95V, β107K, β114W, β167S, β218H, β219A

α68T, β46T, β48N, β57M, β95V, β107K, β114Y, β167S, β218H, β219A

α68G, β17G, β46T, β48N, β57K, β95V, β107K, β114Y, β167S, β218H, β219A

α68G, β17G, β46T, β48N, β57K, β95V, β107K, β114Y, β167S, β218H, β219A

α68G, β17G, β46T, β48N, β57K, β95V, β107K, β114Y, β167S, β218H, β219R

α68G, β17G, β46T, β48N, β57K, β95V, β107K, β114Y, β167S, β218H, β219A

α68G, β17X, β48N, β57M, β95V, β107K, β114F, β167S, β218H, β219A

α68G, β17X, β46T, β48N, β57M, β95V, β107K, β114F, β167S, β218H, β219R

α112V, β17X, β46T, β48N, β57M, β95V, β107K, β114F, β167S, β218H, β219A

α112V, β17X, β46T, β48N, β57M, β95V, β107H, β114F, β167S, β218H, β219A

α112V, β17X, β46T, β48N, β57K, β95V, β107K, β114W, β167S, β218H, β219A

α112V, β17X, β46T, β48N, β57K, β95V, β107K, β114F, β167S, β218A, β219A

α112V, β17X, β46T, β48N, β57K, β95V, β107K, β114F, β167S, β218Q, β219A

α112V, β17X, β46T, β48N, β57K, β95V, β107K, β114F, β167S, β218H, β219R

α187G, β17X, β46T, β48N, β57K, β95V, β107K, β114F, β167S, β218H, β219R

α187G, β17X, β48N, β57K, β95V, β107K, β114W, β167S, β218H, β219A

α187G, β17X, β48N, β57M, β95V, β107K, β114W, β167S, β218H, β219A

α187G, J14S, β46T, β48N, β57M, β95V, β107K, β114W, β167S, β218H, β219R

α187G, J14S, β46T, β48N, β57M, β95V, β107K, β114Y, β167S, β218H, β219A

α187V, J14S, β17G, β46T, β48N, β57K, β95V, β107K, β114Y, β167S, β218H, β219A

α187V, J14S, β17G, β46T, β48N, β57K, β95V, β107K, β114Y, β167S, β218H, β219A

α187V, J14S, β17X, β46T, β48N, β57K, β95V, β107K, β114F, β167S, β218A, β219A

α187V, β17X, β43Q, β46T, β48N, β57K, β95V, β107K, β114F, β167S, β218Q, β219A

α187V, β17X, β43Q, β46T, β48N, β57K, β95V, β107K, β114F, β167S, β218H, β219R

α187V, β17X, β43Q, β46T, β48N, β57K, β95V, β107K, β114F, β167S, β218H, β219R

α187V, β17X, β43Q, β48N, β57K, β95V, β107K, β114W, β167S, β218H, β219A

α187V, β17X, β43Q, β48N, β57M, β95V, β107K, β114W, β167S, β218H, β219A

α187V, β17X, β43Q, β46T, β48N, β57M, β95V, β107K, β114W, β167S, β218H, β219A

α187V, β17X, β43Q, β46T, β48N, β57M, β95V, β107K, β114W, β167S, β218H, β219A

Nitrile hydratase are sensitive to impurities contained into the acrylonitrile solution, more specifically, the cyanhydric acid, and or its salts, decreases their efficiency.

The content of cyanhydric acid, and/or its salts, in the acrylonitrile solution depends on each producer and varies over time. This is a drawback as the nitrile hydratase quantity has to be continuously adjusted during the acrylonitrile conversion, otherwise the final acrylamide may have a high content of residual acrylonitrile which can lead to safety issue.

To maintain the conversion rate of acrylonitrile to acrylamide and lower the amount of residual acrylonitrile in the acrylamide solution, it is necessary to overdose the nitrile hydratase. However, overdosage can lead to many issues on the downstream process such as filtration problems which can lead to a high coloration and turbidity of the final acrylamide product.

To mitigate the effect of cyanhydric acid contained in the acrylonitrile solution, the latest can be purified by a step of contacting the acrylonitrile solution with an aldehyde compound.

The simplest aldehyde is acetaldehyde, but this molecule is known to be carcinogenic, has a low flash point and a boiling point at 20° C., which renders its usage complicated.

The aldehyde compound can be aliphatic or aromatic.

The aldehyde compound can be a compound obtained by reacting a polyacrylamide with a difunctional aldehyde, for example by reacting a polyacrylamide with glyoxal, propanedial, butanedial, pentanedial, or it can be propionaldehyde, butyraldehyde or a mixture of propionaldehyde and butyraldehyde. Preferably the aldehyde compound is butyraldehyde.

The reacting polyacrylamide may be obtained by polymerization of non-ionic monomers and/or anionic monomers, and/or cationic monomers, and/or amphoteric monomers The reacting polyacrylamide has preferably an average molecular weight by weight comprised between 1 000 g/mol and 10 000 000 g/mol.

The reacting polyacrylamide can be linear, structured or cross linked. Preferably the reacting polyacrylamide is linear.

The acrylonitrile solution comprises at least 99% by weight of acrylonitrile, preferably at least 99.5% by weight.

The amount of aldehyde compound brought into contact with the acrylonitrile solution is between 1 ppm and 500 ppm with respect to the amount of acrylonitrile solution, preferably between 5 ppm and 200 ppm, more preferably between 10 ppm and 100 ppm, and even more preferably between 20 ppm and 50 ppm.

The contact time between the acrylonitrile solution and the aldehyde compound is between 5 minutes and 48 hours, preferably between 30 minutes and 24 hours, more preferably between 1 hour and 12 hours.

The mixture of the acrylonitrile solution and the aldehyde compound can be done in the storage tank, in an acrylamide reactor or on the feedline to acrylamide reactor.

The contact between acrylonitrile solution and aldehyde compound can be carried out with a static mixer, with a recirculation line, under agitation, or by natural diffusion.

The purified acrylonitrile solution contains generally less than 20 ppm of cyanhydric acid, preferably less than 10 ppm, more preferably less than 5 ppm.

Acrylamide can be obtained by enzymatic bioconversion of purified acrylonitrile solution obtained by contacting the acrylonitrile solution with an aldehyde compound.

The polyacrylamide polymer can be obtained by polymerization of acrylamide obtained by enzymatic bioconversion of purified acrylonitrile solution.

The polymer obtained from the acrylamide obtained from the purified acrylonitrile can be used in hydrocarbon (oil and/or gas) recovery; in well drilling and cementing; in hydrocarbon (oil and/or gas) well stimulation, e.g. hydraulic fracturing, conformation, diversion; in open, closed or semi-closed water treatment; in fermentation slurry treatment; in paper manufacturing; in construction; in wood processing; in hydraulic composition processing (concrete, cement, mortar and aggregates); in the mining industry; in cosmetics formulation; in detergent formulation; in textile manufacturing; in battery component manufacturing; in geothermal energy; in sanitary napkin manufacturing; or in agriculture.

Uses of the 2-Dimethylaminoethyl Acrylate Polymers

The present invention also relates to the use of the water-soluble polymer of the invention in water treatment, sludge dewatering, papermaking process, agriculture, cosmetic and detergency composition, textile process, oil and gas process such as enhanced oil recovery, fracturing, mining operation such as tailings treatment.

The present invention also relates to the use of the water-soluble polymer of the invention as a dispersant, coagulant, flocculant, thickener, grinding agent, drag reducer, superabsorbent, retention aid.

The present invention will be further described by reference to the following examples, which are merely illustrative of the invention and are not intended to be limiting. Unless otherwise indicated, all percentages are by weight (w %).

FIGURE DESCRIPTION

FIG. 1 illustrates the evaluation of the friction reduction effect of polymer 1 to 5 by FlowLoop tests.

EXAMPLES

Example 1—Storage & Insolubility Rate

Preparation of the Composition

At the end of the 2-dimethylaminoethyl acrylate (DMAEA) monomers synthesis, the monomers are purified via distillation. The distillate fraction, at minimum 9800, of 2-dimethylaminoethyl acrylate monomers is collected. A polymerization inhibitor, monomethyl ether hydroquinone, is added (1000 ppm) and homogeneously mixed. The tocopherol and/or its derivatives, or a tocotrienol and/or its derivatives is then added and homogenously mixed for 30 minutes at 20° C. under air atmosphere. The prepared composition is then transferred to storage and store under air atmosphere for 1 to 12 months. The 2-dimethylaminoethyl acrylate monomers are classically quaternized with methyl chloride, the quaternization being per see known by the skilled person, before being polymerized.

The different compositions prepared are summarized up in table 3.

TABLE 3

| Composition | Tocopherols or tocotrienols | Tocopherols or tocotrienols concentration |
| --- | --- | --- |
| Composition 1 reference | — | — |
| Composition 2 invention | α-tocopherol | 20 ppm |
| Composition 3 invention | | 200 ppm |
| Composition 4 invention | γ-tocopherol | 25 ppm |

TABLE 3-continued

| Composition | Tocopherols or tocotrienols | Tocopherols or tocotrienols concentration |
| --- | --- | --- |
| Composition 5 invention | | 250 ppm |
| Composition 6 invention | α-tocotrienol | 20 ppm |
| Composition 7 invention | | 300 ppm |
| Composition 8 invention | α-tocopherol + 30 ppm of 2,6,-di-tert-butyl-4-methylphenol | 20 ppm |
| Composition 9 invention | | 200 ppm |

The vinyl acrylate concentration in the 2-dimethylaminoethyl acrylate monomers is determined using GC analysis; instrument Agilent 7820A with a MS detector equipped with DB-WAX column 30 m, helium for gas carrier at 1 mL/min. Injector temperature and transfer line are maintained at 250° C. Injection is done with 1 µL at 1:100 split ratio. The oven temperature is at 80° C. for 5 min, then increased at 5° C./min to 122° C. for 2 min, then temperature is increased to 240° C. at 35° C./min for 11 min.

Storage & Insolubility Rate in Polymer Preparation

The UL viscosity (Brookfield viscosity), the insolubility rate and the insolubility point are measured on a 70 mol % of acrylamide and 30 mol % of quaternized DMAEA polymer prepared by classical bulk polymerization.

Measurement of UL viscosity: the UL viscosity is measured using a Brookfield viscometer equipped with a UL adapter, the unit of which rotates at 60 revolutions/minute (0.1 percent by weight of polymer in a 1M saline sodium chloride solution) between 23 and 25° C.

The insolubility rate is measured by transferring 1 g of the polymer solution in 200 ml of water at 20° C., stirring for 2h, then the dissolved solution is filtered with a 4 cm diameter filter with a porosity of 200 µm. After the filtered solution is completely drained, the filter paper is weighted. In case of a non filtrable solution the screen filter is placed at 105° C. for 4 hours. The residual mass is used to determine the insoluble quantity, insolubility rate is related to the initial polymer mass. As mentioned above, the vinyl acrylate impurity creates covalent bonds between 2-dimethylaminoethyl acrylate monomers resulting in aggregates which do not pass into the filter.

The insolubility point corresponds to the number and size of aggregates on the filter, after the whole solution is passed through the filter, visually counted. The following scale is used: point (pt) between 1 and 3 mm; big point (bp) for more than 3 mm.

TABLE 4

| Composition | Duration | Vinyl acrylate concentration in 2-dimethylaminoethyl acrylate monomers | UL viscosity (cps) | Insolubility points | Insolubility rate |
| --- | --- | --- | --- | --- | --- |
| Composition 1 reference | 1 month | 10 ppm | 5.3 | 10 pts | 1% |
| | 3 months | 15 ppm | 5.3 | 20 bps | 2% |
| | 6 months | 40 ppm | Not measurable | Not filtrable | 100% |
| | 12 months | 60 ppm | Not measurable | Not filtrable | 100% |
| Composition 2 Invention | 1 month | 2 ppm | 5.3 | 5 pts | 1% |
| | 3 months | 5 ppm | 5.3 | 10 pts | 1% |
| | 6 months | 10 ppm | 5.3 | 30 pts | 2% |
| | 12 months | 19 ppm | 5.0 | 10 bps | 1% |

TABLE 4-continued

| Composition | Duration | Vinyl acrylate concentration in 2-dimethylaminoethyl acrylate monomers | UL viscosity (cps) | Insolubility points | Insolubility rate |
|---|---|---|---|---|---|
| Composition 3 Invention | 1 month | 1 ppm | 5.2 | 5 pts | 1% |
| | 3 months | 5 ppm | 5.3 | 10 pts | 1% |
| | 6 months | 8 ppm | 5.1 | 30 pts | 2% |
| | 12 months | 18 ppm | 5.3 | 10 bps | 2% |
| Composition 4 invention | 1 month | 3 ppm | 5.3 | 6 pts | 1% |
| | 3 months | 7 ppm | 5.3 | 10 pts | 1% |
| | 6 months | 10 ppm | 5.0 | 30 pts | 2% |
| | 12 months | 20 ppm | 5.2 | 20 bps | 2% |
| Composition 5 invention | 1 month | 2 ppm | 5.3 | 10 pts | 1% |
| | 3 months | 4 ppm | 5.3 | 10 pts | 1% |
| | 6 months | 12 ppm | 5.3 | 30 pts | 2% |
| | 12 months | 19 ppm | 5.0 | 10 bps | 2% |
| Composition 6 invention | 1 month | 3 ppm | 5.2 | 10 pts | 1% |
| | 3 months | 5 ppm | 5.3 | 10 pts | 1% |
| | 6 months | 10 ppm | 5.1 | 30 pts | 2% |
| | 12 months | 19 ppm | 5.3 | 10 bps | 2% |
| Composition 7 invention | 1 month | 1 ppm | 5.3 | 10 pts | 1% |
| | 3 months | 4 ppm | 5.3 | 10 pts | 1% |
| | 6 months | 7 ppm | 5.0 | 30 pts | 2% |
| | 12 months | 18 ppm | 5.2 | 15 bps | 2% |
| Composition 8 invention | 1 month | 1 ppm | 5.3 | 10 pts | 1% |
| | 3 months | 3 ppm | 5.1 | 10 pts | 1% |
| | 6 months | 8 ppm | 5.0 | 30 pts | 2% |
| | 12 months | 15 ppm | 5.2 | 8 bps | 2% |
| Composition 9 invention | 1 month | <1 ppm | 5.1 | 2 pts | <1% |
| | 3 months | 2 ppm | 5.2 | 5 pts | 1% |
| | 6 months | 5 ppm | 5.3 | 20 pts | 1% |
| | 12 months | 12 ppm | 5.3 | 5 bps | 2% |

As we can see based on table 4, the combination of the 2-dimethylaminoethyl acrylate monomers and tocopherol and/or its derivatives, or a tocotrienol and/or its derivatives reduces the formation of vinyl acrylate during the storage.

Even after only 1 month, the monomers of the invention have a reduced amount of vinyl acrylate. Thanks to the invention, monomers can be stored up to 12 months and still have an amount of vinyl acrylate equivalent to about 3 months storage of classical monomers.

Regarding the insolubility point without the combination of the invention, the number of points corresponding to polymer aggregates is more important for monomers stored without tocopherol and/or its derivatives, or a tocotrienol and/or its derivatives, even after one month.

Example 2—Friction Reduction Test

Preparation of the 2-Dimethylaminoethyl Acrylate Polymers.

Different quaternized 2-dimethylaminoethyl acrylate/acrylamide (30%/70%) copolymers were synthetised with a different weight % of 2-dimethylaminoethyl acrylate monomers coming from composition 3, prepared in example 1, after 6 months of storage. The polymers are obtained by classical bulk polymerization.

The compositions of the polymers are summarized in table 5.

TABLE 5

| Polymer | % wt DMAEA combined with α-tocopherol in the quaternized DMAEA/acrylamide copolymer |
|---|---|
| Polymer 1 counter-example | 0 w % of 2-dimethylaminoethyl acrylate |
| Polymer 2 invention | 5 w % of 2-dimethylaminoethyl acrylate |
| Polymer 3 invention | 30 w % of 2-dimethylaminoethyl acrylate |
| Polymer 4 invention | 50 w % of 2-dimethylaminoethyl acrylate |
| Polymer 5 invention | 80 w % of 2-dimethylaminoethyl acrylate |

Hydraulic Fracturing Fluid Preparation

Polymers 1 to 5 are added under stirring, at a concentration of 10,000 ppm, in a brine consisting of water, 85 g of sodium chloride (NaCl) and 33.1 g of calcium chloride ($CaCl_2$, 2H2O) per litre of brine.

The resulting saline polymer solutions are then injected at a concentration of 0.05 pptg (pounds per thousand gallons) (which gives 0.006 g/L=6 g/m3, since 1 pptg=0.1198 g/L) into the recirculating brine for the Flow Loop tests that follow.

Flow Loop Friction Reduction Tests

A friction flow loop was constructed from ¼ inch (which gives 0.635 cm, since 1 inch=2.54 cm) outer diameter stainless steel tubing, 20 feet (which gives 6.096 m, since 1 foot=0.3048 m) in overall length. Test solutions are pumped out of the bottom of a tapered 5-liter reservoir.

The solution flows through the tubing and is returned back into the reservoir. The flow is achieved using a triplex pump equipped with a variable speed drive. 4 liters of fresh water or brine (for instance synthetic brine or sea water) is prepared in the sample reservoir and the pump is started and set to deliver a flow rate of 1.5 gal/min (1 US gal=3.78541 liters). The salt solution is recirculated until the temperature equilibrates at 25° C. and a stabilized pressure differential is achieved. This pressure is recorded as the initial pressure of the fresh water or sea water or brine. To evaluate the friction reduction of each of the polymers 1 to 5, the tank of the Flow Loop was filled with brine described above. The brine is then recirculated in the Flow Loop at a flow rate of 1.5 gal·min$^{-1}$. The polymer is added at a concentration of 0.05 pptg to the recirculating brine.

The test amount of polymer solution is quickly injected with a syringe into the sample reservoir containing the fresh water or sea water or brine and a timer is started. The pressure is recorded every second for 5 minutes. The percentage friction reduction (% FRt) at a given time 't' is calculated from the initial pressure drop ΔPi and the pressure drop at time t, ΔPt, using the equation:

$$\% \ FR_t = \frac{\Delta P_i - \Delta P_t}{\Delta P_i} \times 100$$

FlowLoop results are shown in FIG. 1.

Polymers prepared from the composition of the invention offer better performances, the friction reduction effect is quicker, and the maximum % FRt is higher, making these polymers more efficient than those of the state of the art.

It can be seen from FIG. 1 that the more 2-dimethylaminoethyl acrylate monomers come from the invention, the better the performances of the polymer.

Example 3—Retention Aid in Paper

Retention aid are polymers added to cellulosic fiber slurries before the formation of paper in order to improve the efficiency with which the fine particles, including cellulosic fines, are retained in the paper product.

Type of Pulp Used

Virgin Fiber Pulp:

Wet pulp is obtained by disintegrating dry pulp to obtain a final aqueous concentration of 1% by weight. It is a pH neutral pulp consisting of 90% bleached virgin long fibers, 10% bleached virgin short fibers and 30% additional GCC (ground calcium carbonate) (Hydrocal® 55 from Omya) by weight based on the weight of the fibers.

Evaluation of Total Retention and Ash Retention

For all subsequent tests, the polymer solutions are prepared at 0.5% by weight. After 45 minutes of preparation, the polymer solutions are diluted 10 times prior to injection.

The different results are obtained by using a Britt Jar type device with a stirring speed of 1000 rpm.

The sequence of the process is as follows:
T=0 s: Agitation of 500 mL paper pulp at a concentration of 0.5% by weight.
T=10 s: Addition of the retention agent (300 g of dry polymer/tonne of dry pulp).
T=20 s: Removal of the first 20 mL corresponding to the dead volume under the wire, then recovery of 100 mL of white water.

The percentage of First Pass Retention (% FPR), corresponding to the total retention, is calculated according to the following formula: % FPR=($C_{HB}$-$C_{WW}$)/$C_{HB}$*100

The First Pass Ash Retention as a percentage (% FPAR) is calculated using the following formula: % FPAR=($A_{HB}$-$A_{WW}$)/$A_{HB}$*100 with:
$C_{HB}$: Headbox consistency
$C_{WW}$: White Water Consistency
$A_{HB}$: Headbox ash consistency
$A_{WW}$: White Water Ash Consistency For each of these analyses, the highest values correspond to the best performances.

The same polymers as in example 2 were tested and results are summarized in table 6.

Evaluation of the Performance of Gravity Drainage Using the Canadian Standard Freeness (CSF)

In a beaker, the pulp is treated at a stirring speed of 1000 rpm.

The sequence of the process is as follows:
T=0 s: Agitation of 500 mL of paper pulp at a concentration of 0.6% by weight
T=10 s: Addition of the retention agent (300 g of dry polymer/tonne of dry pulp).
T=20 s: Stop stirring and add the necessary amount of water to obtain 1 liter.

This liter of pulp is transferred to the Canadian Standard Freeness Tester and the TAPPI T227om-99 procedure is applied.

The volume, expressed in mL, recovered by the side tubing gives a gravity dewatering measurement. The higher the value, the better the gravity drainage.

This performance can also be expressed by calculating the percentage improvement over the blank (% CSF).

The highest values correspond to the best performances.

The same polymers as in example 2 were tested and results are summarized in table 6.

TABLE 6

| Polymer | % FPAR | % FPR | % CSF |
|---|---|---|---|
| 1 reference | 22.3 | 65.4 | — |
| 2 invention | 25.2 | 66.6 | 5.2 |
| 3 invention | 27.5 | 67.9 | 10.9 |
| 4 invention | 29.1 | 70.2 | 15.1 |
| 5 invention | 34.6 | 79.7 | 25.9 |

The polymers of the invention offer better performances as retention aid for paper.

Regarding the CSF, polymer prepared with only 2-dimethylaminoethyl acrylate monomers according to the invention offer more than 25% of improved performances.

The more 2-dimethylaminoethyl acrylate monomers come from the invention, the better the performances of the polymer.

The invention claimed is:

1. A water-soluble polymer obtained by polymerization of at least a 2-dimethylaminoethyl acrylate monomer and/or its salts, in presence of at least a tocopherol and/or its derivatives, or a tocotrienol and/or its derivatives.

2. A water-soluble polymer according to claim 1, said water-soluble polymer being obtained by polymerization of at least a 2-dimethylaminoethyl acrylate monomer and/or its salts in presence of at least an α-tocopherol.

3. A water-soluble polymer according to claim 1, wherein the quantity of tocopherol and/or its derivatives, or tocotrienol and/or its derivatives is comprised between 1 ppm and 10 000 ppm, based on the amount of 2-dimethylaminoethyl acrylate monomer and/or its salts.

4. A water-soluble polymer according to claim 1, wherein the tocopherol and/or its derivatives, or the tocotrienol and/or its derivatives, is added to the 2-dimethylaminoethyl acrylate monomer and/or its salts after the synthesis of said 2-dimethylaminoethyl acrylate monomer and/or its salts.

5. A water-soluble polymer according to claim 1, wherein the tocopherol and/or its derivatives, or the tocotrienol and/or its derivatives is added to the 2-dimethylaminoethyl acrylate monomer and/or its salts before the storage of said 2-dimethylaminoethyl acrylate monomers and/or its salts.

6. A water-soluble polymer according to claim 1, wherein the 2-dimethylaminoethyl acrylate monomer is quaternized with methyl chloride.

7. A water-soluble polymer according to claim 1, wherein the water-soluble polymer comprises at least 1 mol % of 2-dimethylaminoethyl acrylate monomer and/or its salts based on the total number of moles of monomers.

8. A water-soluble polymer according to claim 1, wherein the water-soluble polymer has an average molecular weight by weight comprised between 50 000 g/mol and 30 000 000 g/mol.

9. A composition comprising:
 from 1 to 99,9999 w % of at least one 2-dimethylaminoethyl acrylate monomer and/or its salts;
 from 1 to 10 000 ppm of at least a tocopherol and/or its derivatives, or a tocotrienol and/or its derivatives, based on the amount of 2-dimethylaminoethyl acrylate monomer and/or its salts,
 Optionally at least an additive chosen from biocides, polymerization inhibitors, humidity absorbers, colour stabilisers.

10. A composition according to claim 9, comprising at least one colour stabiliser chosen from: niacinamide, retinol, 3-tertiobutyl-4-hydroxyanisole (3-BHA), 2-tertiobutyl-4-hydroxyanisole and 2,6,-di-tert-butyl-4-methylphenol.

11. A composition according to claim 9, wherein the ratio in weight between the tocopherol and/or its derivatives or the tocotrienol and/or its derivatives and the colour stabiliser is comprised between 1 and 100.

12. A method for water treatment, sludge dewatering, papermaking process, agriculture, forming a cosmetic and detergency composition, textile process, or oil and gas process, comprising adding the water-soluble polymer of claim 1 to an aqueous solution.

13. A method for enhancing an aqueous solution, comprising adding to the solution the water-soluble polymer of claim 1 as a dispersant, coagulant, flocculant, thickener, grinding agent, drag reducer, superabsorbent, or retention aid.

14. Process for inhibiting the formation of vinyl acrylate resulting from a reaction between at least a 2-dimethylaminoethyl acrylate monomer and/or its salts and oxygen, comprising mixing said 2-dimethylaminoethyl acrylate monomer and/or its salts with a tocopherol and/or its derivatives, or a tocotrienol and/or its derivatives.

15. A water-soluble polymer according to claim 2, wherein the quantity of tocopherol and/or its derivatives, or tocotrienol and/or its derivatives is comprised between 1 ppm and 10 000 ppm, based on the amount of 2-dimethylaminoethyl acrylate monomer and/or its salts.

16. A water-soluble polymer according to claim 15, wherein the tocopherol and/or its derivatives, or the tocotrienol and/or its derivatives, is added to the 2-dimethylaminoethyl acrylate monomer and/or its salts after the synthesis of said 2-dimethylaminoethyl acrylate monomer and/or its salts.

17. A water-soluble polymer according to claim 16, wherein the tocopherol and/or its derivatives, or the tocotrienol and/or its derivatives is added to the 2-dimethylaminoethyl acrylate monomer and/or its salts before the storage of said 2-dimethylaminoethyl acrylate monomers and/or its salts.

18. A water-soluble polymer according to claim 17, wherein the 2-dimethylaminoethyl acrylate monomer is quaternized with methyl chloride.

19. A water-soluble polymer according to claim 18, wherein the water-soluble polymer:
 comprises at least 1 mol % of 2-dimethylaminoethyl acrylate monomer and/or its salts based on the total number of moles of monomer; and
 has an average molecular weight by weight comprised between 50 000 g/mol and 30 000 000 g/mol.

20. A composition according to claim 10, wherein the ratio in weight between the tocopherol and/or its derivatives or the tocotrienol and/or its derivatives and the colour stabiliser is comprised between 1 and 100.

* * * * *